Aug. 24, 1937.  J. A. CROWELL  2,091,139
BRICK MOLD
Filed Sept. 26, 1935
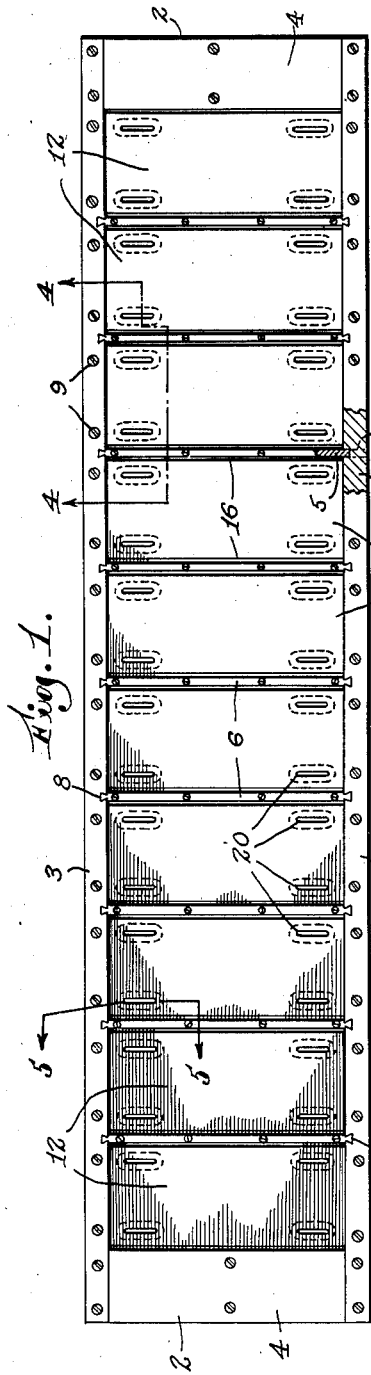
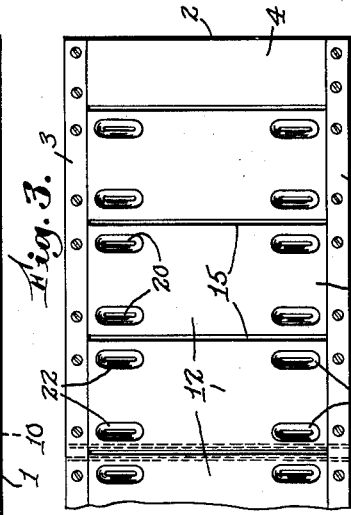
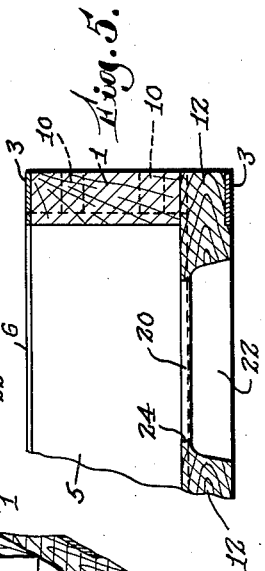
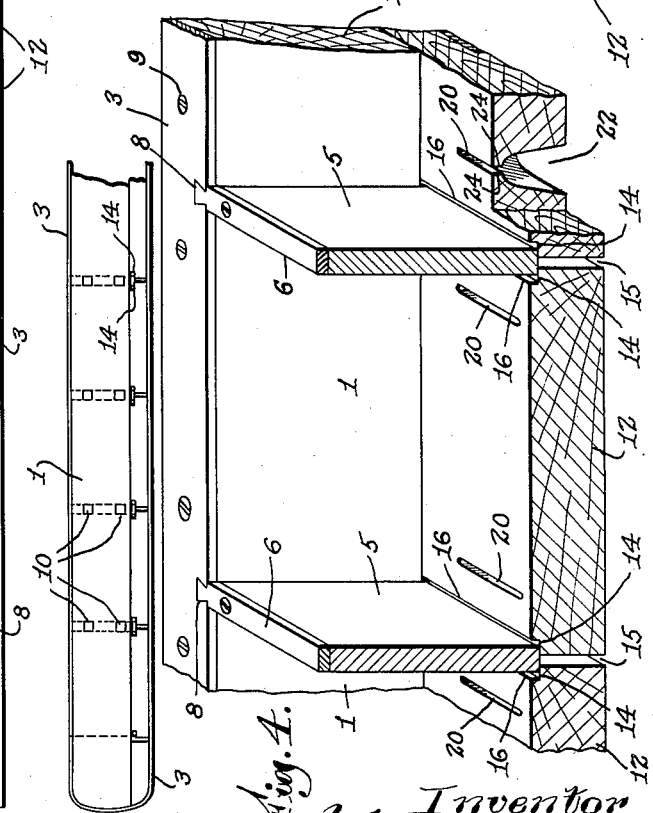
Inventor
J. Addison Crowell
by James R. Hodder
Attorney Patented Aug. 24, 1937

2,091,139

UNITED STATES PATENT OFFICE 2,091,139

BRICK MOLD

J. Addison Crowell, Wallkill, N. Y., assignor to James B. Crowell & Sons, Wallkill, N. Y., a corporation of New York Application September 26, 1935, Serial No. 42,320

1 Claim. (Cl. 25—119)

My present invention is a novel and improved mold construction for use in the manufacture of brick, and is particularly intended to improve and perfect the type of brick molds of my prior patents in this art.

In my development of brick mold construction, particularly molds for use in the present high-speed brick manufacturing machines wherein great speed of operation in filling, handling, bumping, and dumping is involved, particularly as shown for example in my prior Patent No. 1,793,306, dated Feb. 17, 1931, and No. 1,822,646, dated September 8, 1931, I have illustrated and described various forms of improved types of brick molds, and my present invention is directed to improve and perfect this type of mold.

An important feature of the present improvement is the provision and arrangement for an interlocking support between the mold partitions and mold backs with allowance for "give and take" in the wood constituting the partitions and backs when the mold is alternately wet and dry.

A further important feature is the provision of individual and improved forms of vents in the mold back; and a still further feature is the simplicity of construction, eliminating extra iron and wood braces around the mold partitions, etc., and relying upon the interlocking and supporting effect of the construction of partition and back itself, greatly simplifying and strengthening the entire construction of the brick mold, particularly a multiple mold containing a considerable number of mold cavities for use in automatic brick-making machines.

Referring to the drawing illustrating a preferred embodiment of my invention,

Fig. 1 is a plan view of my improved mold showing the invention incorporated in a ten-brick mold for the present so-called automatic soft mud brick making machines;

Fig. 2 is a fragmentary side view;

Fig. 3 is a fragmentary plan view of the bottom of the mold;

Fig. 4 is an enlarged perspective view on the line 4—4 of Fig. 1, particularly in cross-section of the detailed interlocking construction of partition and back, together with my novel form of vent, and Fig. 5 is a fragmentary enlarged cross-sectional view on the line 5—5 of Fig. 1.

While I have shown in the drawing a multiple brick mold of large capacity, such for example as a ten-brick mold structure, it will be appreciated that my interlocking construction and improved vent may be utilized in a single mold, if desired, but in practically all modern soft brick manufacturing plants where automatic and high-speed presses or machines are employed brick molds from six, eight, and often ten or more mold cavities are utilized, all such cavities being filled at a single operation when the brick mold is positioned underneath the press of the molding machine and the mold is then filled, carried from underneath the machine to striking, bumping, dumping, and sanding operations, and returned for a subsequent filling operation, a large number of molds being filled and dumped in the meantime.

During the cycle of operations of such brick molds being alternately filled with wet and plastic mud and then subjected to partially drying overnight or when not in use, the wood of the molds is alternately wet and dry and, hence, is under constant swelling and shrinking. This has been a major difficulty with prior mold constructions and, in addition, the heavy bumping and jarring to which the mold is subjected to loosen the molded clay in each cavity to facilitate the dumping action has also subjected such molds to great stress, strain, wear, and damage. As the number of mold cavities has increased, and as the speed and pressure of the mold filling, conveying, and jarring mechanism has increased, great added strain has been put on the mold structure so that prior constructions have presented constant difficulties and problems to the mold manufacturer, both for structural strength and to enable each mold to be full and accurately filled with clay during the instantaneous pressing action. In the latter instance it has been most difficult to provide suitable vents to permit the air entrapped within the mold cavity when the press is acting to fill the cavity with plastic clay to escape, and furthermore, to have the entire cavity filled with the corners and edges clean and clear cut in each instance.

The difficulty of this problem will be appreciated when it is realized that practically every different type of clay in nearly every different brickyard vent capacities must be changed and scientifically positioned, measured, and built to provide an efficient venting in each mold cavity for the particular clay involved.

Also the speed of the press is a factor in determining such venting of the clay molds.

In my present invention I have obviated the difficulties heretofore experienced, and have improved and perfected such mold construction.

I have illustrated in Fig. 1 a typical standard type of mold embodying my improved construction wherein a ten-brick cavity mold is illustrated, comprising sides 1—1, end blocks 2—2, with the sides respectively braced and reinforced on the top portions with metal strips 3—3, and the end blocks have metal strips 4—4 together with a series of partitions 5—5, with cross-metal braces 6—6, preferably being dovetailed into undercut recesses in the metal strips 3—3, as shown at 8—8. These metal strips are also secured to the respective parts which they cover and protect by screws or metallic fastenings, shown at 9, and preferably also the partitions 5—5 are dovetailed into the sides 1, as indicated at 10—10.

With the construction as thus far outlined, I have devised my novel and improved interlocking and supporting back and partition structure to provide for swelling and shrinking of the wood when wet and dry, which produces a tight, firm corner and edge on the molded brick, eliminating fins, etc., and also have provided my novel form of vent.

For this purpose I make the back 12, which constitutes the bottom of each mold and which is permanently fastened and secured to the sides 1—1, with a recessed and shouldered grooved edge portion, as shown at 14 adapted to interlock with the partitions 5—5 constituting the side walls of each mold cavity and provide a spacing 15—15 between the side edge of each adjacent back 12—12. This shoulder 14 is formed and spaced relatively with the thickness and position of the partition 5 to which it fits, so that two backs 12 will be under and support each partition 5 intermediate the length of the entire set of partitions. Furthermore, the shoulders 14 are formed so that when dry there will be a slight spacing from the back constituting the bottom of the mold cavity, as indicated at 16, but when wet and the wood swells this will tighten up, giving a complete and firm bearing between the backs 12 and partitions 5 thru the mutual supporting and interlocking of the partitions on the shoulders 14.

This feature is most important and enables me to eliminate the use of metal strips, blocks, or the like, and braces across the middle of the partitions and back, the fastenings of which tend to split the wood while it is wet and swells; whereas I utilize the swelling to effect a better tightening, supporting, and interlocking structure between the backs and partitions.

I also eliminate the cost and expense of having metal sides, blocks, braces, or edges for the backs and also for the vents, the provision of allowance for expansion of each back tending to decrease or prevent the closing of the vents in the backs when the wood swells, particularly as formed in my present and improved arrangement.

In making the vents, I preferably adjust the capacity of the same for each particular clay to be utilized in the machine and set of molds therefor, it being most important to have a vent of suitable capacity but neither too great nor too small.

In my present form I cut a plurality of vents, preferably adjacent each corner, viz. four in each back as shown at 20—20, having relatively small and thin openings in the back at the mold bearing side, and then form an enlarged recess as shown at 22 on the under side, being in effect a counterbored construction giving a relatively thin partition adjacent the opening 20, as shown at 24, on each side of the slot 20. This construction facilitates the maintenance of the vent 20 of desired proportions, prevents all clogging of the same, and limits also the variation in capacity of the vent during the swelling and shrinking of the wood.

I claim:

An improved multiple brick mold construction of the kind described, comprising a plurality of clay-receiving molds of all-wooden surfaces for sanding, the molds comprising wooden sides, wooden partitions having their ends secured to said sides and forming the ends of the individual molds and a separate wooden back forming the bottom of each mold, the edges of adjacent backs being spaced a distance less than the thickness of the partition, a shouldered recess formed in each adjacent edge of the backs and extending lengthwise thereof with the bottom of each recess extending under the partition, adjacent recesses cooperating to form a channel into which the lower end of the partition extends with the bottom edge of the partition resting on the bottoms of adjacent recesses, whereby a constant supporting contact between the partition and the edge portions of adjacent backs is provided, the width of the channel being so proportioned with respect to the thickness of the partition that the side walls of the channel will exert a clamping action on the partition when the mold is wet and expanded, but will be spaced from the partition when the mold is dry and contracted.

J. ADDISON CROWELL.